United States Patent
Ashizawa et al.

[11] Patent Number: 5,857,937
[45] Date of Patent: Jan. 12, 1999

[54] CONTINUOUSLY VARIABLE TRANSMISSION CONTROLLER

[75] Inventors: Hiroyuki Ashizawa, Fujisawa; Kazutaka Adachi, Yokohama; Ken Ito, Tokyo, all of Japan

[73] Assignee: Nissan Motor Co., Ltd., Yokohama, Japan

[21] Appl. No.: 790,013

[22] Filed: Jan. 28, 1997

[30] Foreign Application Priority Data

Jan. 31, 1996 [JP] Japan ..................................... 8-015444

[51] Int. Cl.$^6$ ...................................................... F16H 9/00
[52] U.S. Cl. ................................. 477/46; 477/43; 477/48
[58] Field of Search ............................... 477/43, 46, 48, 477/45; 701/58, 59, 61

[56] References Cited

U.S. PATENT DOCUMENTS

| | | | |
|---|---|---|---|
| 4,715,258 | 12/1987 | Shigematsu et al. | 477/43 |
| 4,753,627 | 6/1988 | Kawamoto | 477/45 X |
| 4,829,433 | 5/1989 | Nakano et al. | 477/48 X |
| 5,152,191 | 10/1992 | Sato et al. | 477/40 X |
| 5,161,433 | 11/1992 | Sakakibara et al. | 477/43 |
| 5,364,321 | 11/1994 | Togai et al. | 477/42 |
| 5,628,705 | 5/1997 | Kashiwabara | 477/46 |
| 5,672,137 | 9/1997 | Adachi et al. | 477/45 |
| 5,695,428 | 12/1997 | Yuasa et al. | 477/48 |
| 5,720,692 | 2/1998 | Kashiwabara | 477/45 |

FOREIGN PATENT DOCUMENTS

| | | |
|---|---|---|
| 59-217047 | 12/1984 | Japan . |
| 3-121358 | 5/1991 | Japan . |
| 8-178055 | 7/1996 | Japan . |

*Primary Examiner*—Dirk Wright
*Assistant Examiner*—Peter T. Kwon
*Attorney, Agent, or Firm*—Foley & Lardner

[57] ABSTRACT

A speed change ratio of a continuously variable transmission for converting the rotation of the output shaft of an engine in a stepless manner and transmitting it to a drive shaft of a vehicle is controlled to a target speed change ratio. A target vehicle speed at a predetermined future time is estimated based on a real vehicle speed, and the target speed change ratio is calculated based on the estimated vehicle speed. By controlling a real speed change ratio to this target speed change ratio, the response of the transmission is enhanced. Preferably, a feedback vehicle speed is calculated by processing the estimated vehicle speed with a predetermined lag element. By integrating a difference between the real vehicle speed and feedback speed so as to estimate the vehicle speed at the predetermined future time, hunting of the speed change ratio in the speed change ratio control is suppressed.

7 Claims, 15 Drawing Sheets

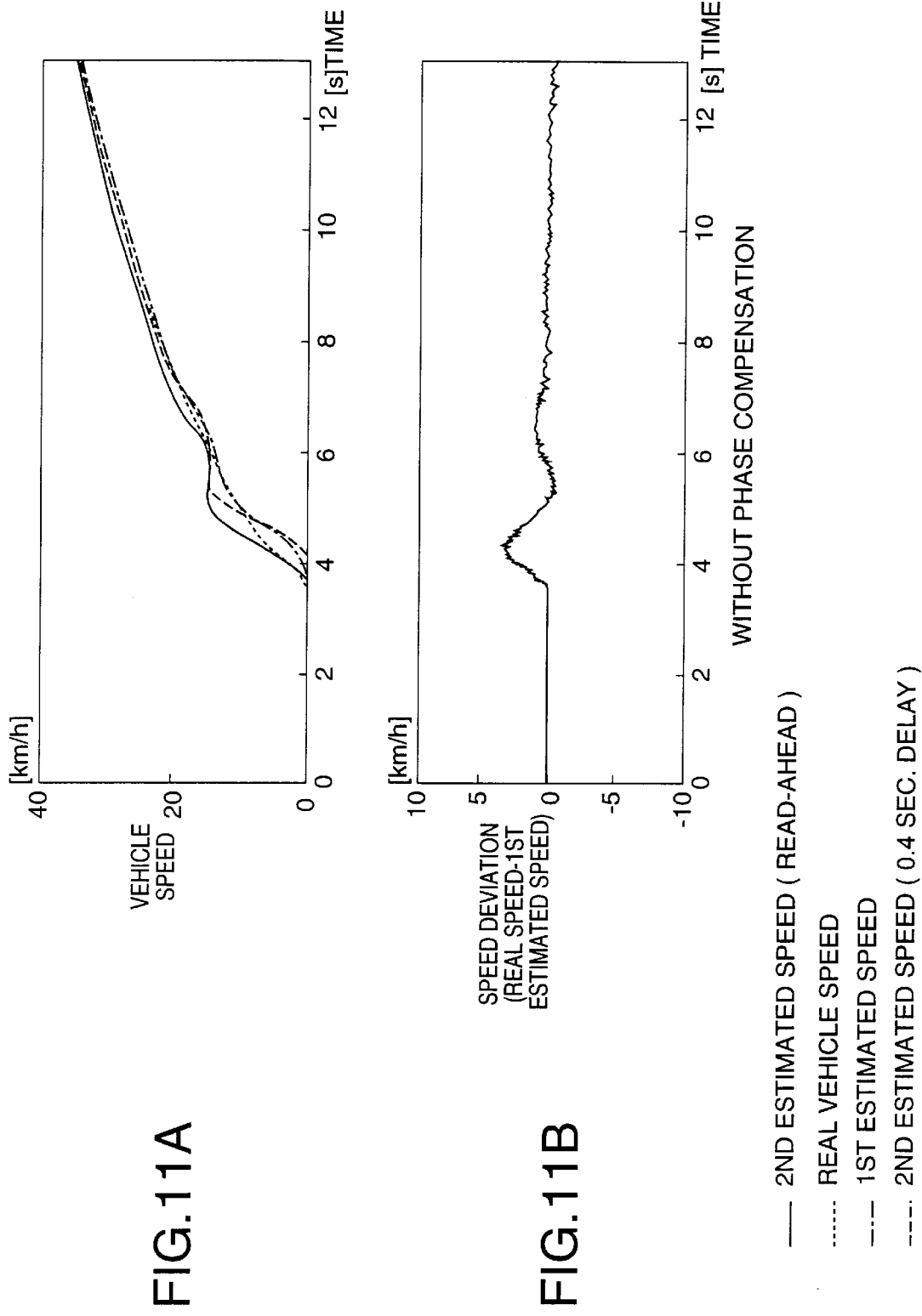

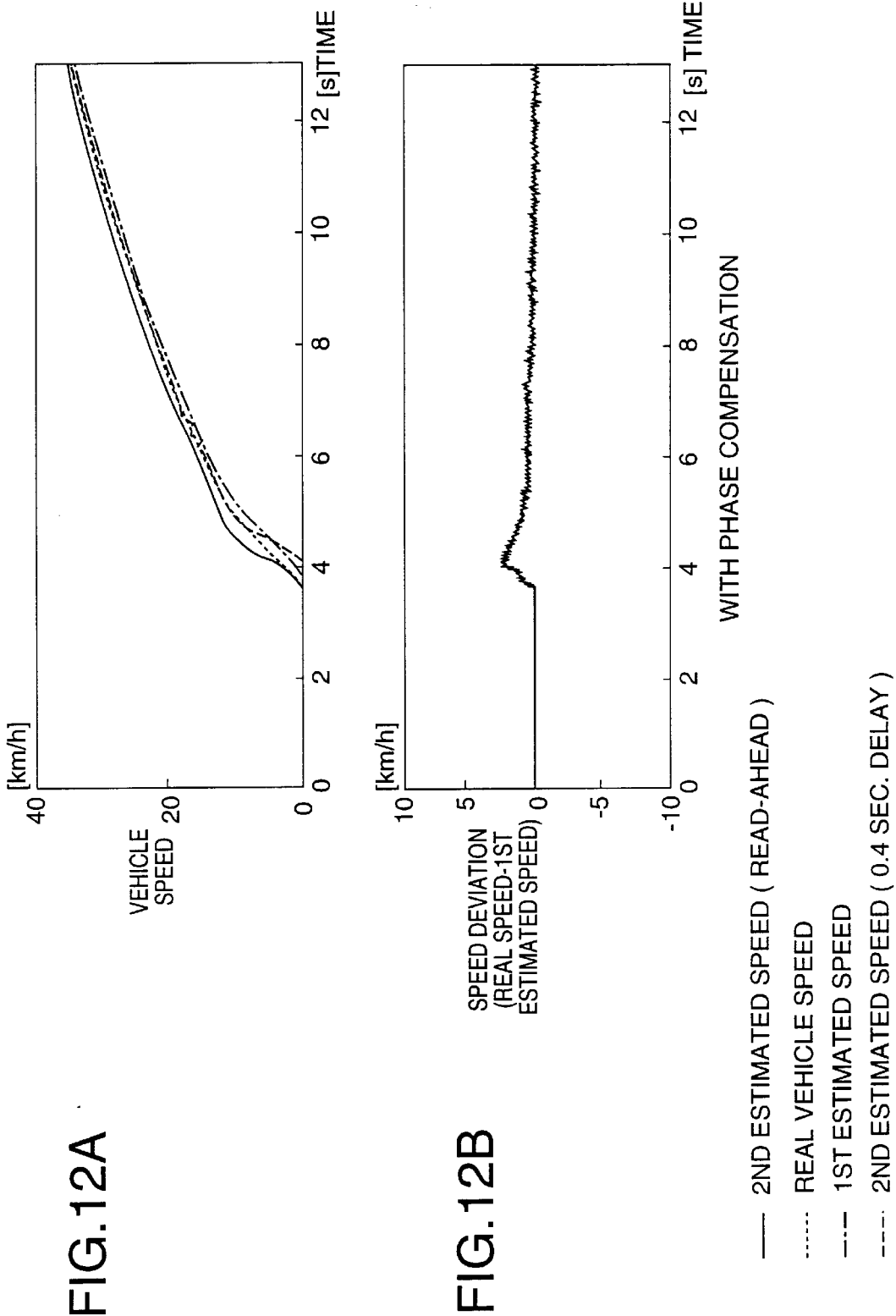

CONTINUOUSLY VARIABLE TRANSMISSION CONTROLLER

FIELD OF THE INVENTION

This invention relates to control of a continuously variable transmission for a vehicle.

BACKGROUND OF THE INVENTION

A continuously variable transmission system for a vehicle for example comprises a hydraulic transmission such as a torque converter or fluid coupling and a continuously variable transmission (referred to hereafter as CVT). The hydraulic transmission transmits an engine rotation output to CVT, and CVT changes the rotation speed of the engine output in a stepless mode and transmits it to a vehicle drive shaft.

CVT is disclosed for example in Tokkai Hei 3-121358 published in 1991, and Tokkai Sho 59-217047 published in 1984 by the Japanese Patent Office.

Such a CVT has an arbitrary gear ratio, a rotational force being communicated via for example a V-belt looped around a drive pulley and a driven pulley. The speed change ratio can be continuously varied by increasing the width of one pulley and decreasing the width of the other, and oil pressure supplied through a gear control valve acts on each pulley so as to change its width. The speed change ratio is therefore varied by increasing and decreasing the opening of the speed change ratio control valve.

In this case, a target speed change ratio is preset according to driving conditions such as engine rotation speed and engine load. A control mechanism feedback controls the opening of the speed change ratio control valve so that, for example, the real rotational speed of the CVT output shaft coincides with a rotation speed corresponding to a set speed change ratio based on vehicle driving conditions.

There is thus a response delay until the real speed change ratio changes after the speed change ratio control valve opening is changed. Also, the oil pressure acting on each pulley of CVT is not necessarily directly proportional to the speed change ratio, and the dynamic characteristics of the speed change ratio when a change is made from one ratio to another are not uniform.

Accordingly, even when a real velocity is compared with a target velocity and the speed change ratio control valve is feedback controlled, a desired control response may not be obtained, the CVT output may give rise to hunting, and the vehicle and driver may experience a shock due to an excessive change of speed change ratio.

SUMMARY OF THE INVENTION

It is therefore an object of this invention to enhance the control response of a CVT.

It is a further object of this invention to suppress hunting in CVT control.

In order to achieve the above objects, this invention provides a speed change ratio controller for a continuously variable transmission which changes and transmits a rotation speed of an engine output shaft of a vehicle to a drive shaft of the vehicle. The controller comprises a mechanism for detecting a travel speed of the vehicle, a mechanism for detecting a real speed change ratio of the continuously variable transmission, a mechanism for estimating a vehicle speed at a target predetermined future time based on the travel speed, a mechanism for computing a target speed change ratio based on the vehicle speed at the target predetermined future time, and a mechanism for controlling the real speed change ratio to the target speed change ratio.

It is preferable that the vehicle speed estimating mechanism comprises a mechanism for computing a feedback vehicle speed by processing the vehicle speed at the target predetermined future time with a predetermined lag element, a mechanism for calculating a difference between the travel speed and the feedback vehicle speed, and a mechanism for computing the vehicle speed at the predetermined future time by a predetermined integration based on the difference.

It is further preferable that the vehicle speed estimating mechanism comprises a mechanism for detecting an engine load, a mechanism for detecting an engine rotation speed, a mechanism for computing a torque generated by the engine, a mechanism for computing a vehicle acceleration based on the generated torque and the real gear ratio, and a mechanism for computing a corrected difference based on the acceleration and the difference, and the vehicle speed computing mechanism computes the vehicle speed at the predetermined future time by performing a predetermined integration based on this corrected difference.

The lag element is preferably a first order lag element specified by the following equation:

$$G_M(s) = \frac{1}{T_M \cdot s + 1}$$

where, $G_M(s)$=lag element
$T_M$=time constant corresponding to a read-ahead time targeted by the designer
s=Laplace operator Alternatively, the lag element is a dead time specified by the following equation:

$$G_M(s) = e^{-T_M \cdot s}$$

where, $G_M(s)$=lag element
$T_M$=time constant corresponding to a read-ahead time targeted by the designer
s=Laplace operator It is also preferable that the vehicle speed estimating mechanism comprises a phase compensator for freely setting a response of the vehicle speed at the predetermined future time relative to a result of the predetermined integral calculation.

A compensation of the phase compensator is preferably specified by the following equation:

$$Gh(s) = \frac{T_1 \cdot s + 1}{T_2 \cdot s + 1}$$

where, $T_1$=phase compensation constant-1
$T_2$=phase compensation constant-2

The details as well as other features and advantages of this invention are set forth in the remainder of the specification and are shown in the accompanying drawings.

BRIEF DESCRIPTION OF THE DRAWINGS

FIGS. 11A and 11B are graphs of vehicle speed and vehicle speed deviation showing simulation results applying the control diagram of the second embodiment without phase compensation.

FIGS. 12A and 12B are graphs of vehicle speed and vehicle speed deviation showing simulation results applying the control diagram of the second embodiment with phase compensation.

DESCRIPTION OF THE PREFERRED EMBODIMENTS

Figure 1:
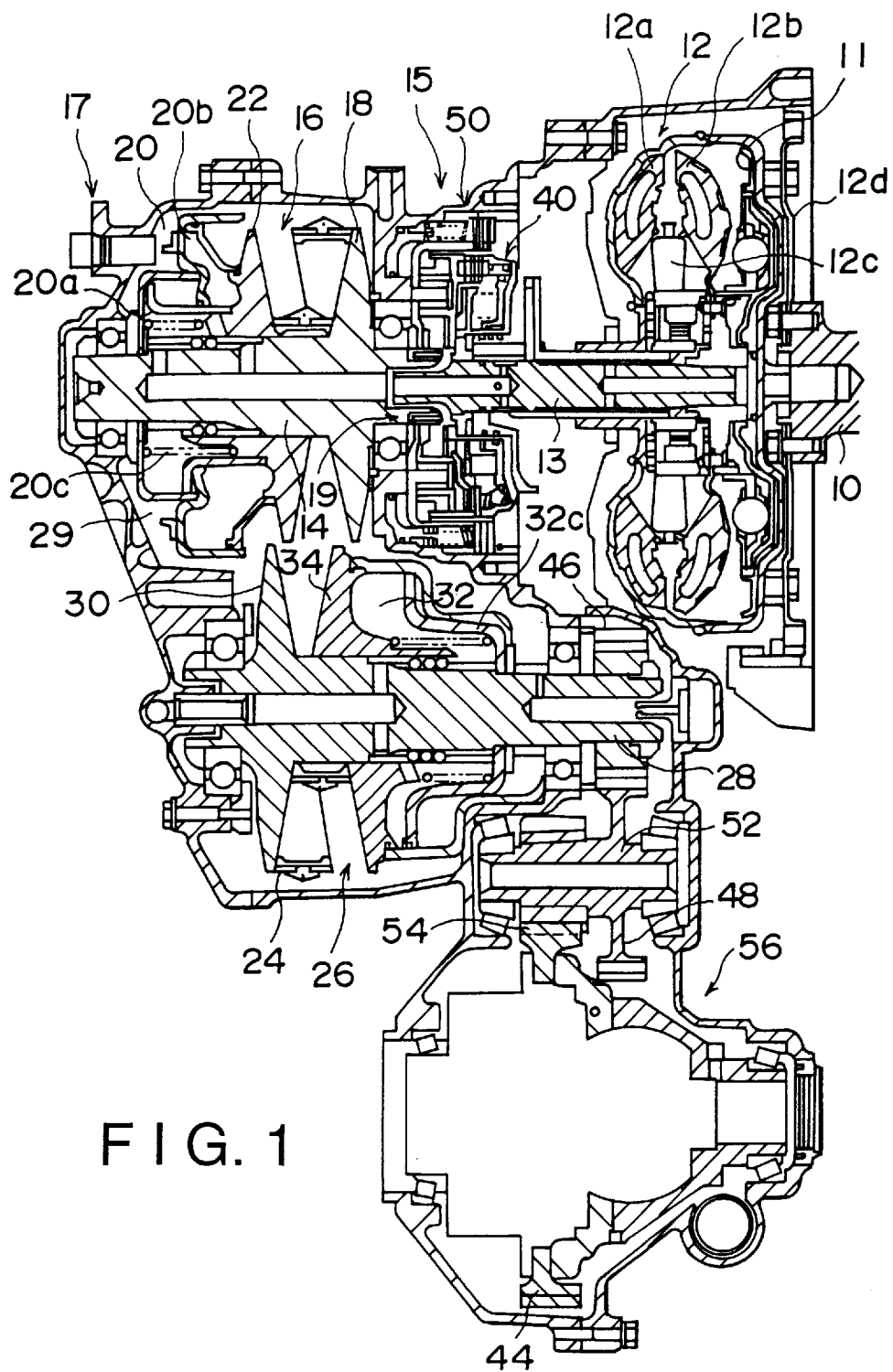
FIG. 1 is a longitudinal sectional view of a continuously variable transmission to which this invention is applied.

Referring to FIG. 1 of the drawings, a torque converter 12 is connected to an engine output shaft 10. A fluid coupling or an electromagnetic clutch may be used instead of the torque converter 12.

The torque converter 12 comprises a lockup clutch 11. The lockup clutch 11 mechanically connects or disconnects an impeller 12a which is an input part and a turbine 12b which is an output part according to the oil pressure supplied to a converter chamber 12c and a lockup oil chamber 12d.

The turbine 12b is connected to a rotation shaft 13, the rotation shaft 13 being connected to a forward/reverse change-over mechanism 15. The mechanism 15 comprises a planetary gear mechanism 19, forward clutch 40 and reverse brake 50. The output shaft of the mechanism 19 is connected to a drive shaft 14 formed coaxially with the rotation shaft 13. The drive shaft 14 comprises the input shaft of a continuously variable transmission (CVT) 17.

The CVT 17 comprises a drive pulley 16 and driven pulley 26, and a V-belt 24 which transmits the rotation of the drive pulley 16 to the driven pulley 26, as described hereinabove.

The drive pulley 16 comprises a fixed conical plate 18 which rotates together with the drive shaft 14 and a movable conical plate 22 disposed relative to the fixed conical plate 18 forming a V-shaped pulley groove with the fixed conical plate 18. The movable conical plate 22 moves in the axial direction of the drive shaft 14 according to an oil pressure acting on a drive pulley cylinder chamber 20 while it rotates with the fixed conical plate 18. The drive pulley cylinder chamber 20 comprises a chamber 20a and chamber 20b. The movable conical plate 22 has a pressure receiving surface larger that of a movable conical plate 34 described hereinafter.

The driven pulley 26 is installed on a driven shaft 28. The driven pulley 26 comprises a fixed conical plate 30 which rotates together with the driven shaft 28 and a movable conical plate 34 disposed relative to the fixed conical plate 30 forming a V-shaped pulley groove with the fixed conical plate 30. The movable conical plate 34 moves in the axial direction of the driven shaft 28 according to an oil pressure acting on a driven pulley cylinder chamber 32 while it rotates with the fixed conical plated 30.

The driven pulley 28 is provided with a driven gear 46 which rotates together with the pulley 28. The driven gear 46 engages with an idler gear 48 on an idle shaft 52. The idler shaft 52 comprises a pinion gear 54 which rotates together with the shaft 52. The pinion gear 54 engages with a final gear 44. The final gear 44 drives a propeller shaft or drive shaft, not shown, via a differential unit 56.

The rotation input to the CVT 17 from the engine output shaft 10 is transmitted to the forward/reverse change-over mechanism 15 via the torque converter 12 and rotation shaft 13. When the forward clutch 40 is engaged and the reverse brake 50 is released, the rotation of the rotation shaft 13 is transmitted to the drive shaft 14 of the CVT 17 with the same rotation direction via the planetary gear mechanism 19 whereof the input shaft and output shaft rotate together. On the other hand, when the forward clutch 40 is released and the reverse brake 50 is engaged, the rotation of the rotation shaft 13 is transmitted to the drive shaft 14 with the opposite rotation direction due to the action of the planetary gear mechanism 19.

The rotation of the drive shaft 14 is transmitted to the differential unit 56 drive pulley 16, V-belt 24, driven pulley 26, driven shaft 28, drive gear 46, idler gear 48, idler shaft 53, pinion gear 54 and final gear 44. When the forward clutch 40 and reverse brake 50 are both released, the forward/reverse change-over mechanism 15 goes into neutral, and transmission of a rotation from the rotation shaft 13 to the drive shaft 14 does not occur.

In the aforesaid dynamic transmission, the rotation ratio, i.e. speed change ratio (deceleration ratio) between the drive pulley 16 and driven pulley 26 varies when the movable conical plate 22 of the drive pulley 16 and movable conical plate 34 of the driven pulley 26 are moved in axial direction so as to alter the contact point radius with the V-belt 24. For example, if the width of the V-shaped pulley groove of the drive pulley 16 is enlarged and the width of the V-shaped pulley groove of the driven pulley 26 is narrowed, the contact point radius of the V-belt 24 on the side of the drive pulley 16 decreases and the contact point radius of the V-belt 24 on the side of the driven pulley 24 increases, so a large deceleration ratio is obtained. When the movable conical plates 22, 34 are moved in the opposite direction, the deceleration ratio becomes smaller.

This control of the widths of the V-shaped pulley grooves of the drive pulley 16 and driven pulley 26 is performed by controlling the relative pressures of the drive pulley cylinder chamber 20 (20a, 20b) and driven pulley cylinder chamber 32 via a control system described hereinafter.

Figure 2:
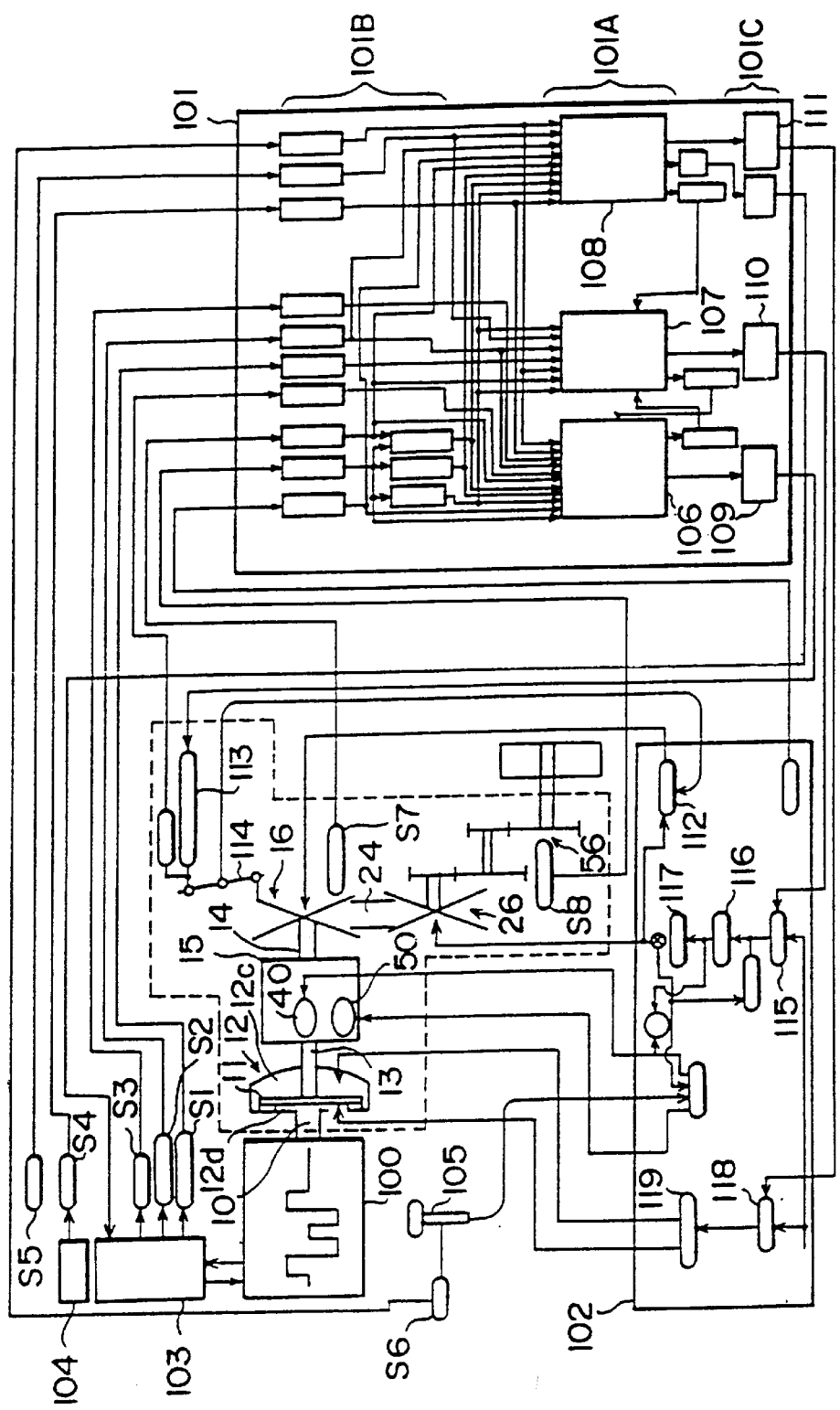
FIG. 2 is a schematic diagram of an electronic control unit according to this invention.

The rotation ratio of the CVT 17 is controlled by the controller shown in FIG. 2. The same symbols are used as for the mechanism in FIG. 1.

In FIG. 2, 101 is an electronic control unit comprising a microcomputer, and 102 is an oil pressure control unit comprising various oil pressure control valves. In this control system, the main means of controlling the CVT 17 are the electronic control unit 101 and the hydraulic control unit 102.

The electronic control unit 101 comprises a central processing unit (CPU) 101A which performs control computations, an input unit 101B which converts running state signals from the engine and vehicle to a format suitable for processing and inputs them to the CPU 101A, and an output unit 101C which converts control signals output by the CPU 101A to drive signals for corresponding instruments and circuits, and outputs them. Various signals are input to the input unit 101B, i.e., a water temperature signal from a water temperature sensor S1 which is used by a control module 103 for electronic control of a fuel injection amount and ignition timing of the engine 100, a throttle opening signal from a throttle opening sensor S2, an engine rotation signal from an engine rotation sensor S3, an ABS working signal from a switch S4 attached to an antilock brake system (ABS) controller 104, a braking signal S5 from a braking sensor S5, a selector position signal from a selector position sensor S6 which shows an operating position of a selector lever 105, a rotation speed signal (turbine rotation speed signal) from a turbine rotation sensor S7 which shows rotation speed of the drive pulley 16, and a rotation speed signal (vehicle speed signal) from a rotation speed sensor S8 which shows rotation speed of the driven pulley 26.

The input unit 101B supplies these signals to the CPU 101A as necessary.

The CPU 101A comprises a speed change ratio control unit 106, line pressure control unit 107 and lockup control unit 108, computes control signals from using required signals selected from the aforesaid signals, and controls the speed change ratio, line pressure and lockup clutch of the CVT 17 by driving a step motor drive circuit 109, line pressure solenoid drive circuit 110 and lockup solenoid drive circuit 111.

Describing the functions of the CPU 101A in more detail, the speed change ratio control unit 106 outputs a control signal to the step motor drive circuit 109 so that speed change ratio change takes place according to a preset pattern depending on engine load represented by the throttle opening, engine rotation speed and vehicle speed.

Based on this control signal, the step motor drive circuit 109 drives a step motor 113 connected to the control valve 112 of the oil pressure control unit 102.

The step motor 113 drives the control valve 112 so as to obtain a speed change ratio corresponding to the signal from the step motor drive circuit 109, controls the line pressure supplied to the drive pulley cylinder chamber 20 shown in FIG. 1, and varies the pressures of the drive pulley cylinder chamber 20 and driven pulley chamber 32 relative to each other.

In the control valve 112, the displacement position of the drive pulley 16, i.e. the speed change ratio, is feedback controlled via a link 114. Due to this feedback control, the speed change ratio control unit 106 fixes the relative pressures of the pulley cylinder chambers 20 and 32 so that the speed change ratio is maintained at a target speed change ratio after the speed change ratio corresponding to the position of the step motor 113 has been obtained.

In this speed change ratio control of the CVT 17, when the line pressure acting on the pulleys 16 and 26 are too small, the frictional force between the pulleys 16,18 and the V-belt 24 Is insufficient so that the V-belt 24 slips. Conversely, when the line pressure is excessive, the frictional force becomes uselessly large. In either case, there is an adverse effect on the fuel consumption and power performance of the vehicle. The line pressure control unit 107 therefore controls the line pressure via the line pressure solenoid drive circuit 110 so that the power transmitted is neither excessive nor deficient according to the running conditions.

In other words, the line pressure solenoid drive circuit 110 controls the position of the line pressure solenoid 115 of the oil pressure control unit 102 according to the control signal from the drive circuit 110. The line pressure solenoid 115 supplies an oil pressure from a hydraulic pump, not shown, to the driven pulley chamber 32 after the pressure is adjusted to a suitable target line pressure via a modifier (pressure control valve) 116 and regulator (constant pressure valve) 117, and also supplies the drive pulley cylinder chamber 20 via the control valve 112.

The lockup control unit 108 engages the lockup clutch 11 when for example the vehicle speed increases beyond a predetermined value, and disengages it when the vehicle speed falls to less than this predetermined value.

In other words, the lockup control unit 108 drives the lockup solenoid 118 of the oil pressure control unit 102 via the lockup solenoid drive circuit 111 according to the vehicle speed, and the lockup control valve 119 is changed over accordingly. The lockup control valve 119 is a valve which changes over between a system which supplies the oil pressure of the hydraulic pump to a converter chamber 12c of the torque converter 12 as an applied pressure of the lockup clutch 11 while releasing a lockup oil chamber 12d, and a system which supplies the oil pressure of the hydraulic pump to the lockup oil chamber 12d as a release pressure while releasing the converter chamber 12c.

The above-mentioned CVT and the basic structure of its controller are disclosed in Tokkai Hei 8-178055 published by the Japanese Patent Office in 1996.

This invention has special distinctive features in respect of the speed change ratio control unit 106.

Figure 3:
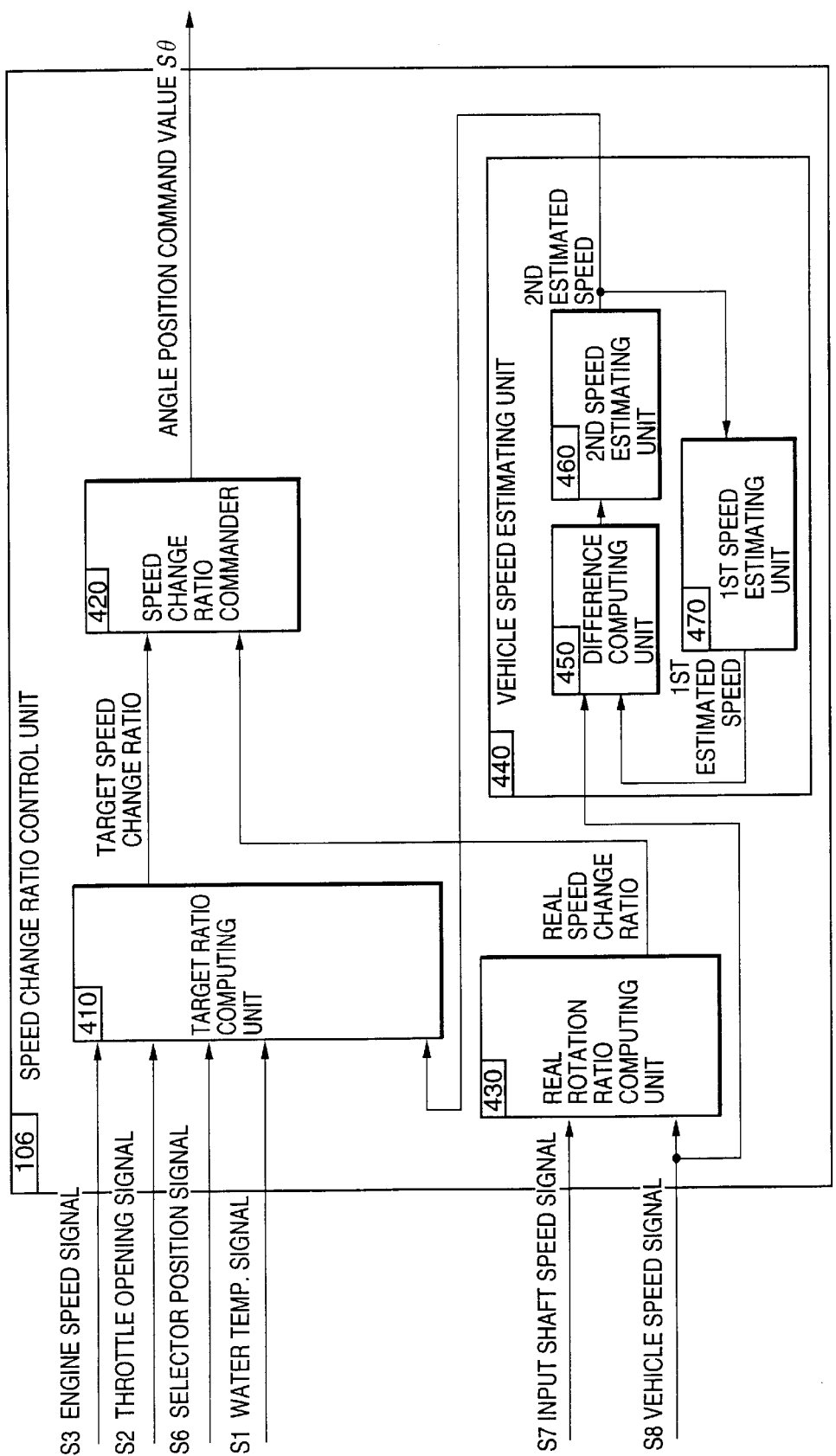
FIG. 3 is a block diagram of a speed change ratio control unit of the electronic control unit.
Figure 15:
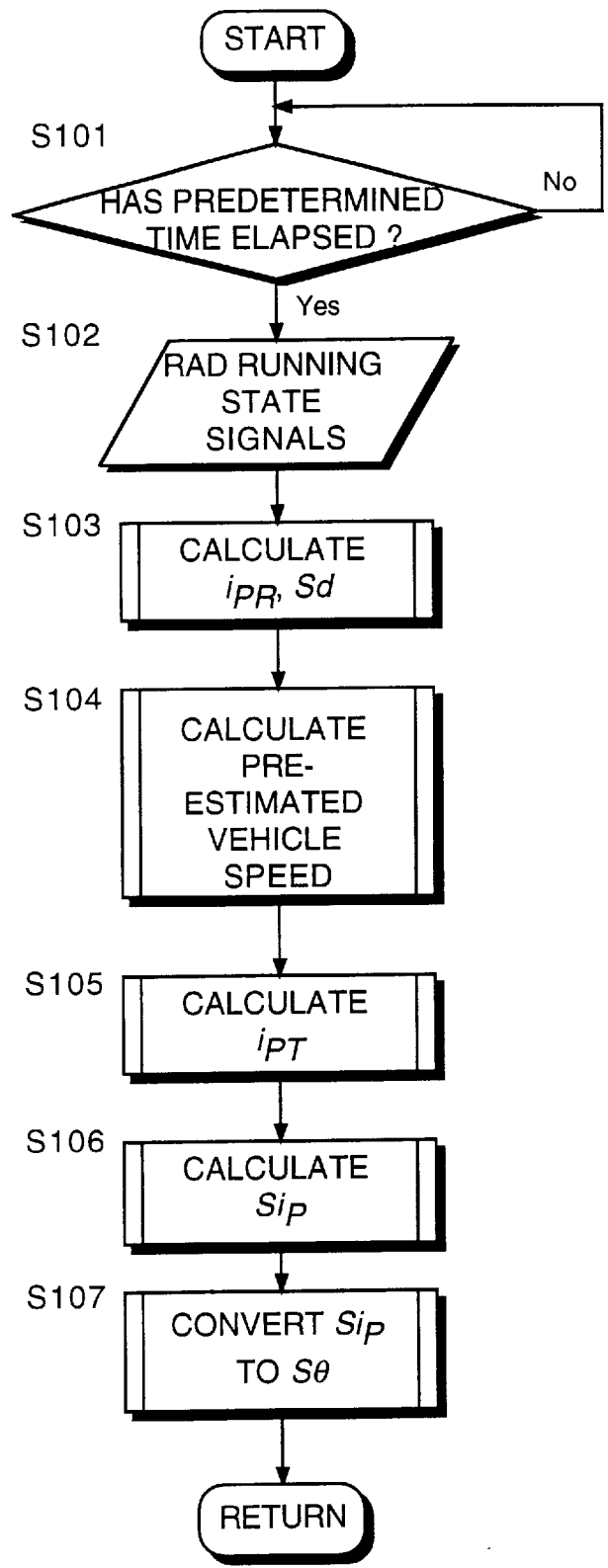
FIG. 15 is a flow chart describing a speed change control process of the speed change ratio control unit shown in FIG. 3.

As shown by FIG. 3, the speed change ratio control unit 106 comprises a target speed change ratio computing unit 410, speed change ratio commander 420, real speed change ratio computing unit 430 and vehicle speed estimating unit 440, and performs speed change ratio control according to the control diagram of FIG. 15.

Now describing this speed change ratio control process, in a step S101, it is determined whether or not a predetermined time has elapsed from the immediately preceding occasion when the process was executed so that the process is executed at predetermined time intervals. In a step S102, signals from sensors S1–S3 and S6–S8 are read.

In a step S103, the real speed change ratio computing unit 430 computes a real speed change ratio $i_{pR}$ of CVT 17 from the rotation speed of the drive pulley 16 and rotation speed of the driven pulley 26.

In a step S104 the vehicle speed estimating unit 440 estimates the vehicle speed (read-ahead vehicle speed) after a predetermined time has elapsed from the present time.

In a step S105, the target speed change ratio computing unit 410 computes a target gear ratio $i_{pT}$ corresponding to a running state which, in addition to running state signals such as the throttle opening signal and the engine rotation speed signal is based on the vehicle speed after the predetermined time has elapsed that was estimated in the step S104.

In a step S106, the speed change ratio commander 420 performs a feedback computation which calculates a speed change ratio command value that causes the real speed change ratio $i_{pR}$ to approach the target speed change ratio $i_{pT}$ with a predetermined characteristic, and in a step S107, the speed change ratio command value is output as a drive signal Sθ corresponding to the angle position of the step motor 113.

The vehicle speed estimating unit 440 comprises a deviation computing unit 450 which computes a difference between the real vehicle speed and a first estimated vehicle speed, a second speed estimating unit 460 which computes a second estimated vehicle speed $V_2$, and a first speed estimating unit 470 which computes the first estimated vehicle speed $V_1$.

Figure 4:
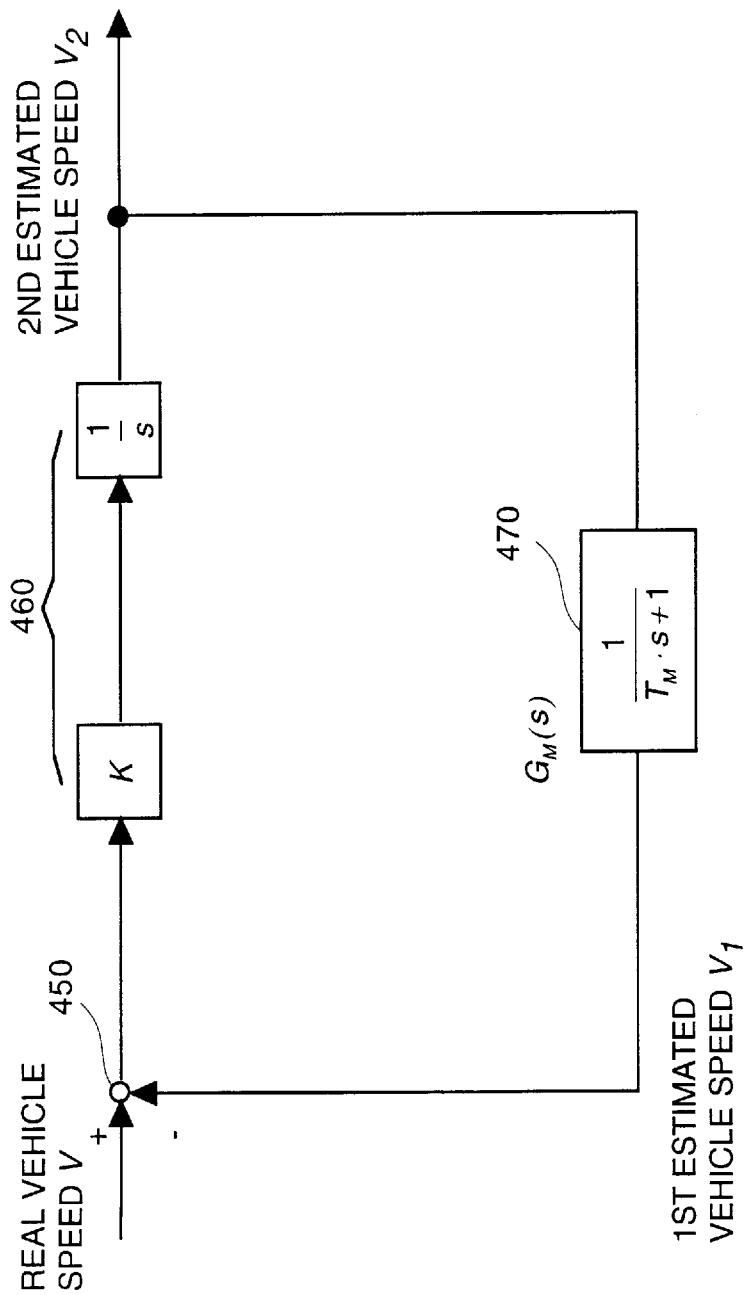
FIG. 4 is a control diagram showing a process of a vehicle speed promoting unit in the speed change ratio control unit.

The vehicle speed estimating unit 440 multiplies input signals by a feedback gain K in the second speed estimating unit 460, and performs an integration by a Laplace operator s so as to calculate a second estimated vehicle speed $V_2$, as shown in FIG. 4. The first speed estimating unit 470 then performs first order lag processing on the second estimated vehicle speed $V_2$ so as to calculate the first estimated vehicle speed $V_1$.

When the first estimated vehicle speed $V_1$ coincides with the real vehicle speed V, the second estimated vehicle speed $V_2$ is considered to be a read-ahead vehicle speed which is to be obtained within a time period depending on predetermined lag elements. Hence, the vehicle speed estimating unit 440 inputs the second estimated vehicle speed $V_2$ when the first estimated vehicle speed $V_1$ and the real vehicle speed V coincide, to the target speed change ratio computing unit 410.

The detailed processing performed by the vehicle speed estimating unit 440 will now be described.

A vehicle speed error Verr is first computed based on the following expression (1-1) from the real vehicle speed V and the first estimated vehicle speed $V_1$.

$$Verr = V - V_1 \tag{1-1}$$

In this calculation, the initial value of $V_1$ may be set to the real vehicle speed V, i.e., the initial value of Verr is zero.

The second estimated vehicle speed $V_2$ is computed by inputting the vehicle speed error Verr and multiplying by an arbitrary feedback gain K, and performing an integral computation shown by the following expression (1-2).

$$V_2 = K \cdot \frac{1}{s} \tag{1-2}$$

where, K=feedback gain
s=Laplace operator

The aforesaid first estimated vehicle speed $V_1$, is computed by inputting the second estimated vehicle speed $V_2$, and applying a first order lag coefficient $G_M(s)$ shown in the following expression (1-3) in a computing unit 470.

$$G_M(s) = \frac{1}{T_M \cdot s + 1} \tag{1-3}$$

where, $T_M$=time constant corresponding to a read-ahead time targeted by the designer.

Figure 5:
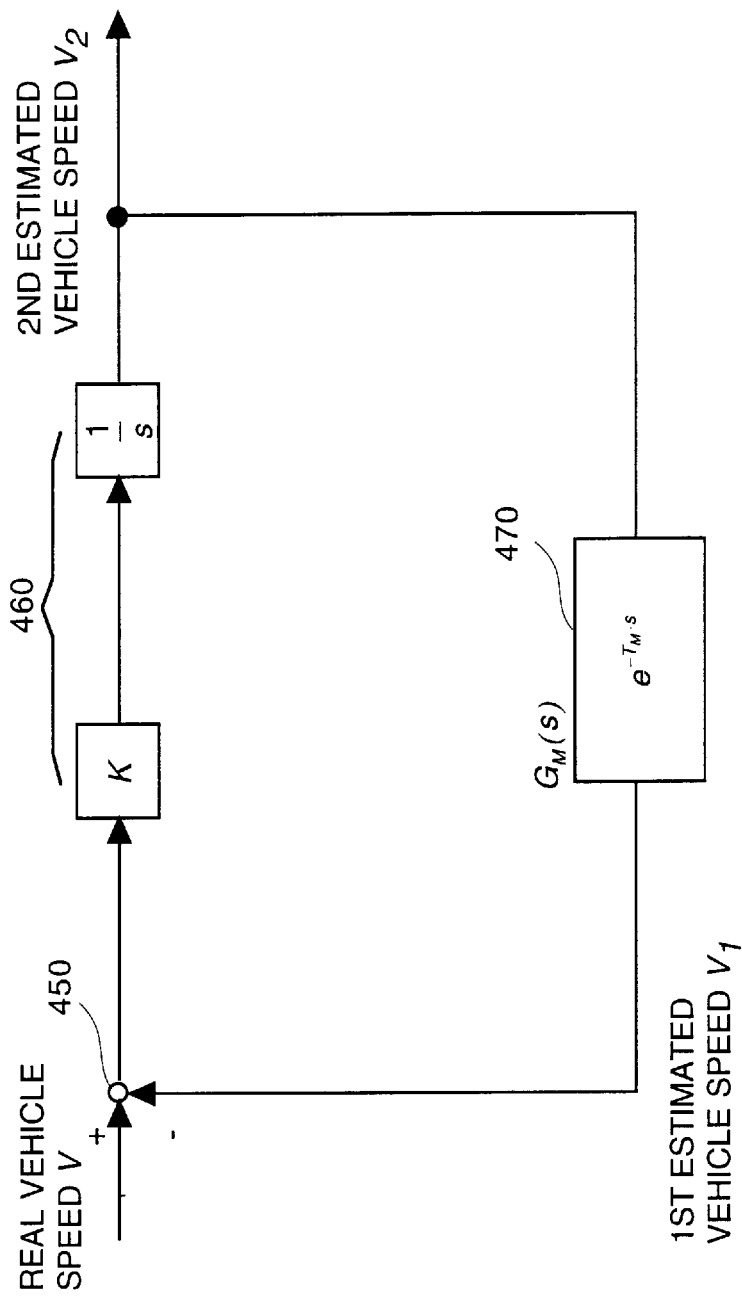
FIG. 5 is a control diagram when a transfer function in FIG. 4 is considered to be equal to dead time.

$G_M(s)$ can also be expressed as a dead time represented by FIG. 5 and the following equation (1-4).

$$G_M(s) = e^{-T_M \cdot s} \tag{1-4}$$

By determining the target speed change ratio using the read-ahead vehicle speed $V_2$ at a predetermined future time determined in this way, the tracking characteristics of the variation of the real speed change ratio relative to the variation of target speed change ratio are improved, and the speed change response of the CVT is enhanced.

Figure 9A:
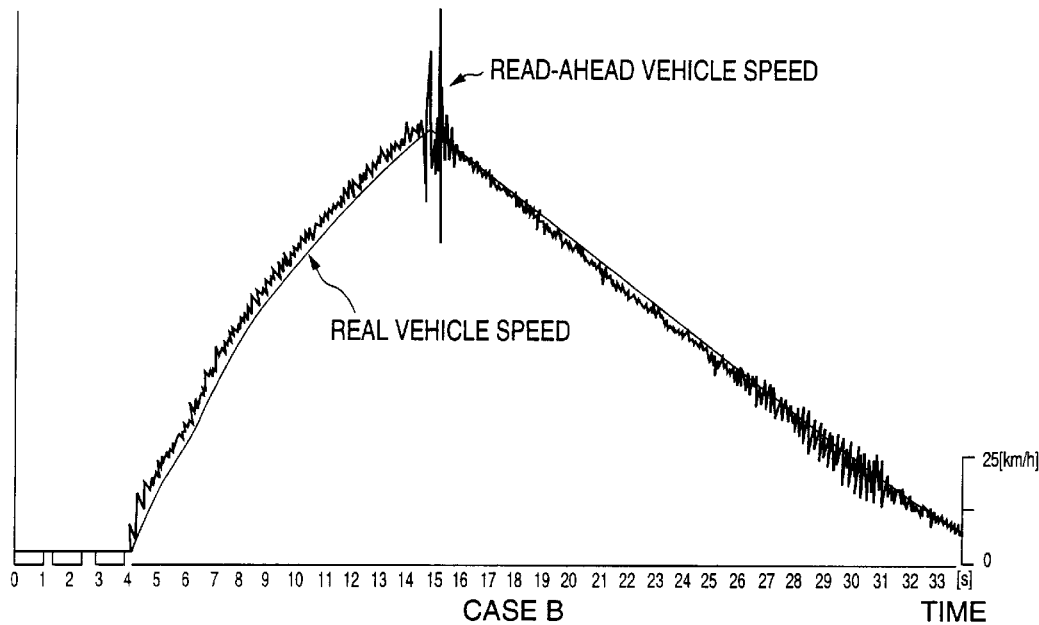
FIGS. 9A and 9B are timing charts showing a calculated vehicle speed using the control diagram of the first embodiment, and a calculated vehicle speed calculated by a digital differential method.
Figure 9B:
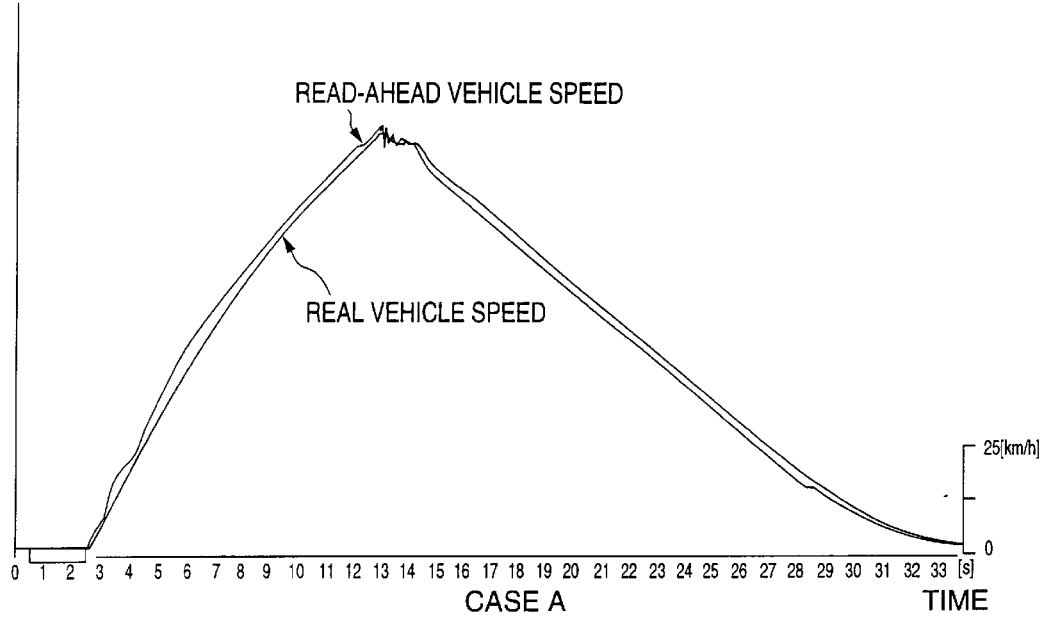
Figure 10A:
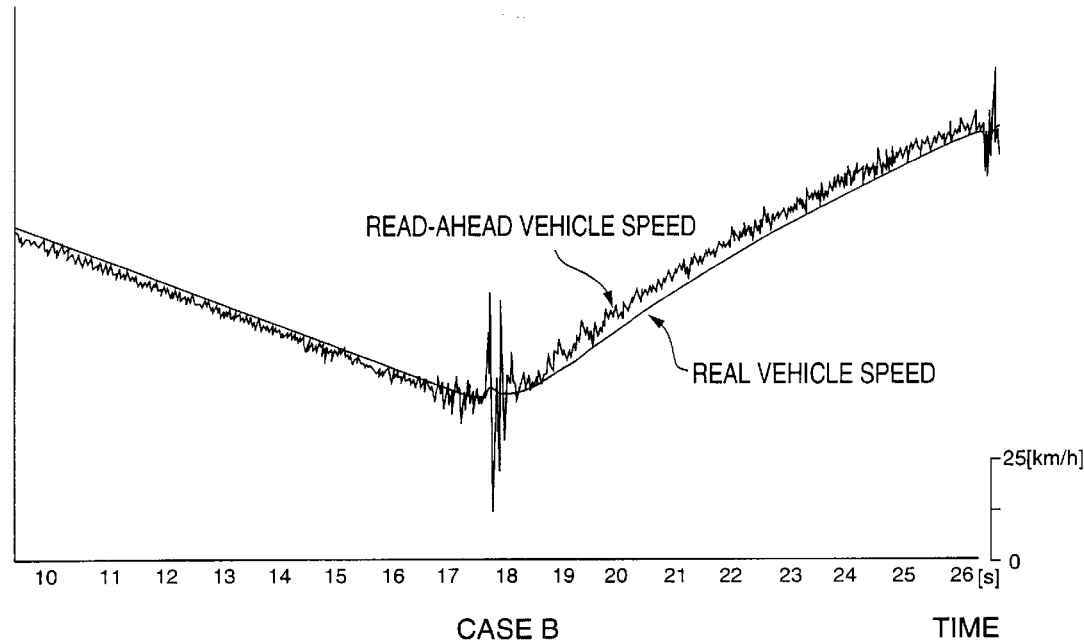
FIGS. 10A and 10B are similar to FIGS. 9A and 9B, but showing a kick down state.
Figure 10B:
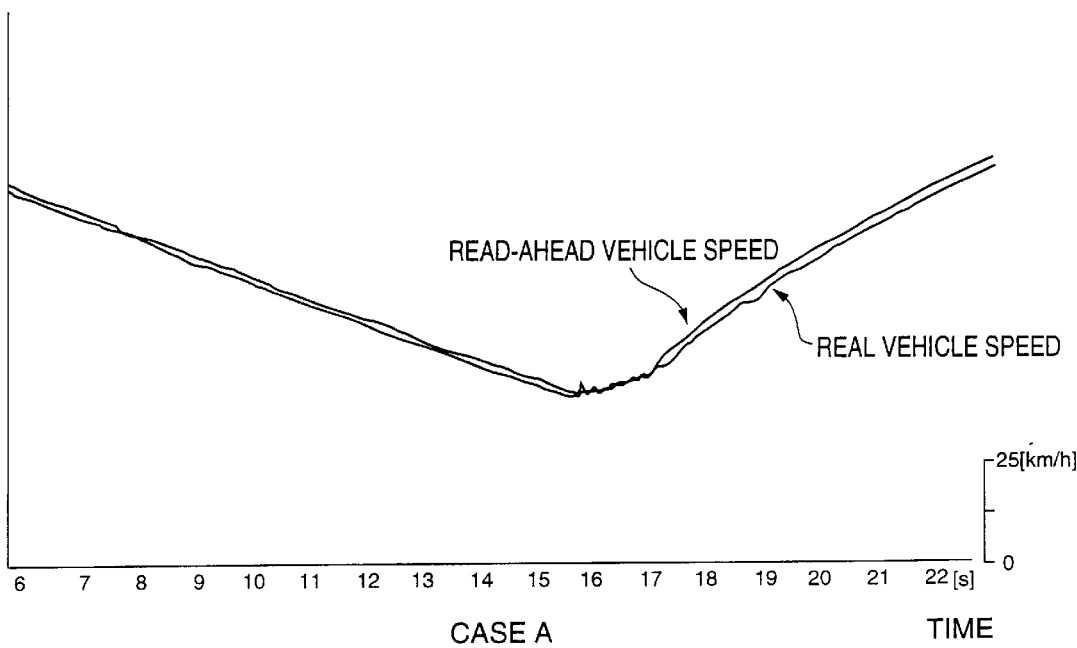

The experimental results obtained with this controller using an engine tester are shown in FIGS. 9A and 9B, and FIGS. 10A and 10B. Case A corresponds to this embodiment. FIGS. 9A and 9B show the speed change ratio when the vehicle accelerates immediately after starting, and decelerates to the coasting state due to braking. FIGS. 10A and 10B show the speed change ratio when a kick down takes place.

The constants used by the vehicle speed estimating unit are as follows.

$T_M$=0.5(sec), K=10.0

The read-ahead vehicle speed may be obtained by digital differentiation from the current vehicle speed and past vehicle speed.

The experimental results obtained when the target gear ratio is determined based on this digital differentiation method are also shown as case B.

As can be seen from the experimental results, it was found that case A is superior to case B in the following points.

When the foot is released from the accelerator pedal at the end of acceleration and when kick down is performed in order to accelerate, hunting of read-ahead vehicle speed is suppressed.

The read-ahead vehicle speed varies smoothly, and there is no noise. In particular, hunting does not occur when the vehicle is coasting.

Figure 6:
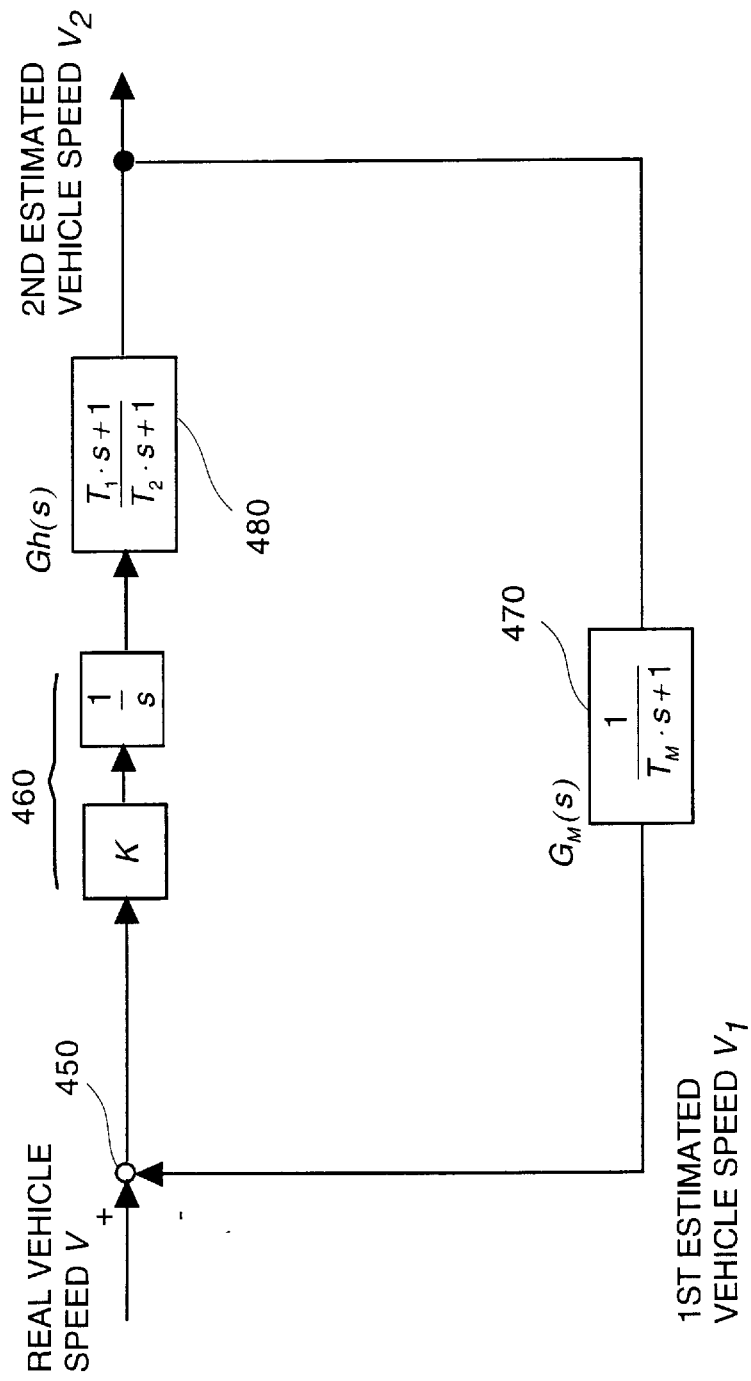
FIG. 6 is similar to FIG. 4, but showing a second embodiment of this invention.

FIG. 6 shows a second embodiment of this invention.

Considering the aforesaid lag element as a first order lag, the system transfer coefficient G(s) may be expressed by the following equation.

$$G(s) = \frac{K \cdot T_M \cdot s + K}{s^2 + 2 \cdot \zeta \cdot \omega_n \cdot s + \omega_n^2} \tag{2-1}$$

$$\text{where, } \omega_n = \sqrt{\frac{K}{T_M}} \tag{2-2}$$

$$\zeta = \frac{\sqrt{\frac{1}{K \cdot T_M}}}{2} \tag{2-3}$$

The following observations may be made regarding the natural vibration frequency $\omega_n$ and damping factor $\zeta$ in the equations (2-2), (2-3).

When the feedback gain K is increased in an effort to reduce the difference between the real vehicle speed and the first estimated vehicle speed, the natural oscillation frequency of the control result becomes higher and damping becomes poorer.

When the target read-ahead time constant $T_M$ is large, damping is poor.

According to the second embodiment, therefore, a 1st order/1st order phase compensator 480 to compensate phase in the equation $$Gh(s) = \frac{T_1 \cdot s + 1}{T_2 \cdot s + 1}$$

is therefore added after the integral computation of the second speed estimating unit 460, as shown in FIG. 6. The open loop transfer function G(s) of the vehicle speed estimating unit 440 is then as shown in the following equation (3-1).

$$G(s) = \frac{K \cdot T_1 \cdot T_M \cdot s^2 + K \cdot (T_1 + T_2) \cdot B_1 \cdot s + K}{(s + P_m) \cdot (s^2 + 2 \cdot \zeta \cdot \omega_n \cdot s + \omega_n^2)} \quad (3\text{-}1)$$

$$= \frac{K \cdot T_1 \cdot T_M \cdot s^2 + K \cdot (T_1 + T_2) \cdot B_1 \cdot s + KB_0}{s^3 + A_2 \cdot s^2 + A_1 \cdot s + A_0}$$

$$A_2 = P_m + 2 \cdot \zeta \cdot \omega_n = \frac{T_1 + T_M}{T_2 \cdot T_M} \quad (3\text{-}2)$$

$$A_2 = P_m + 2 \cdot \zeta \cdot \omega_n = \frac{T_1 + T_M}{T_2 \cdot T_M} \quad (3\text{-}3)$$

$$A_0 = \omega_n^2 \cdot P_m = \frac{1}{T_2 \cdot T_M} \quad (3\text{-}4)$$

where, Pm=first order lag pole
$T_1$=phase compensation constant-1
$T_2$=phase compensation constant-2

With regard to (3-2)–(3-4), for the three unknowns $P_m$, $\omega_n$ and $\zeta$, there are three constants that can be arbitrarily set by the designer, i.e. the phase compensation constants $T_1$, $T_2$ and the feedback gain K. The designer may thus determine the phase compensation constants $T_1$, $T_2$ and the feedback gain K so as to obtain a desired 1st order delay pole $P_m$, natural vibration frequency $\omega_n$ and damping factor $\zeta$.

FIGS. 11A, 11B show simulation results when phase compensation is not applied, and FIGS. 12A, 12B show simulation results when phase compensation is applied. From the results, it is seen that the response of the read-ahead vehicle speed immediately after the vehicle starts (2.5–6.0 sec) is improved by applying phase compensation. The constants used by the vehicle speed estimating unit in the experiment with and without phase compensation, were as follows.

With phase compensation:
$T_1$=0.125 (sec)
$T_2$=0.49 (sec)
$T_M$=0.5 (sec)
K=4.0

Without phase compensation:
$T_M$=0.5 (sec)
K=10.0

Figure 7:
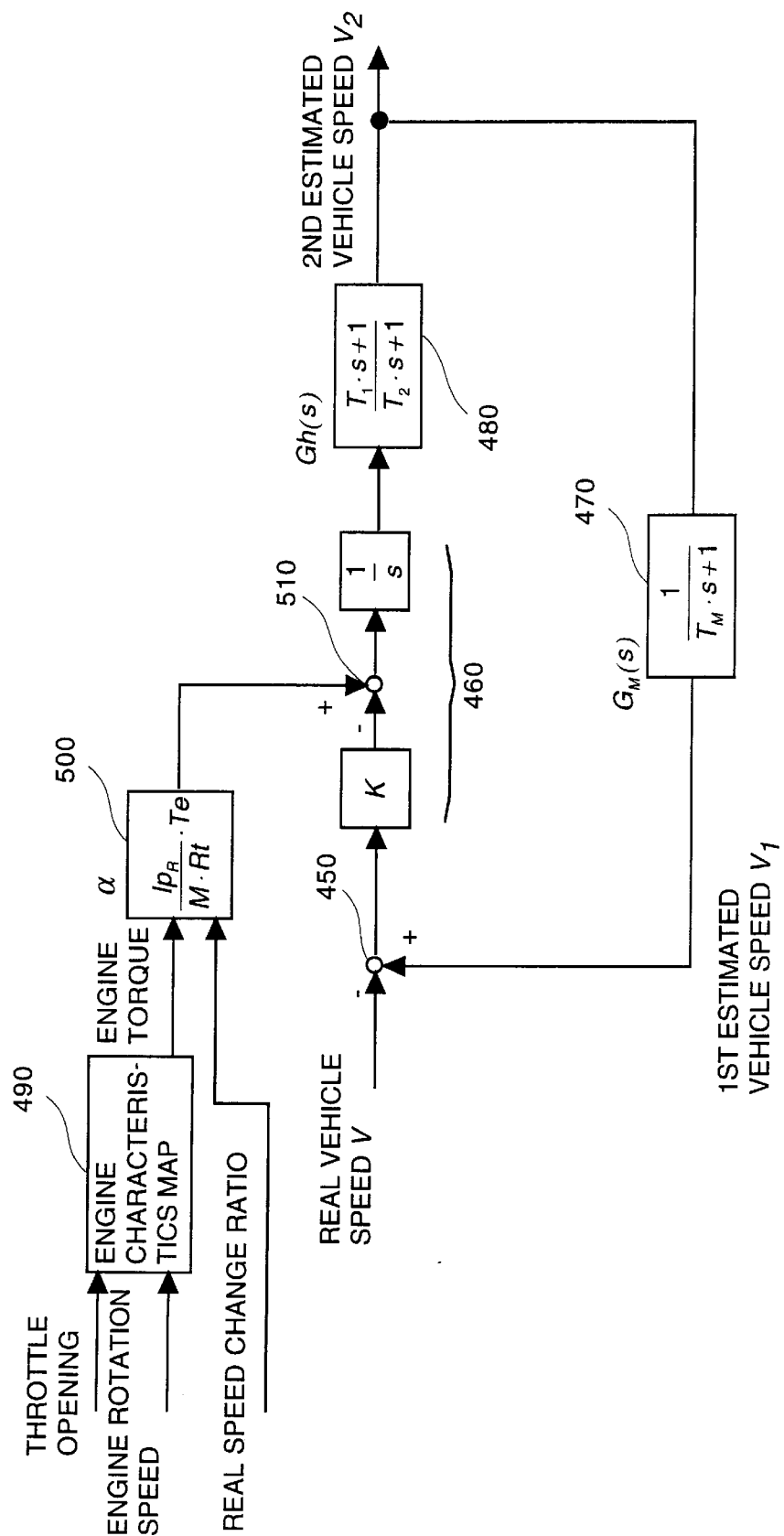
FIG. 7 is similar to FIG. 4, but showing a third embodiment of this invention.

FIG. 7 shows a third embodiment of this invention wherein the second speed estimating unit 460 is additionally provided with an open loop correcting function so as to estimate the read-ahead vehicle speed with still better precision.

Figure 8:
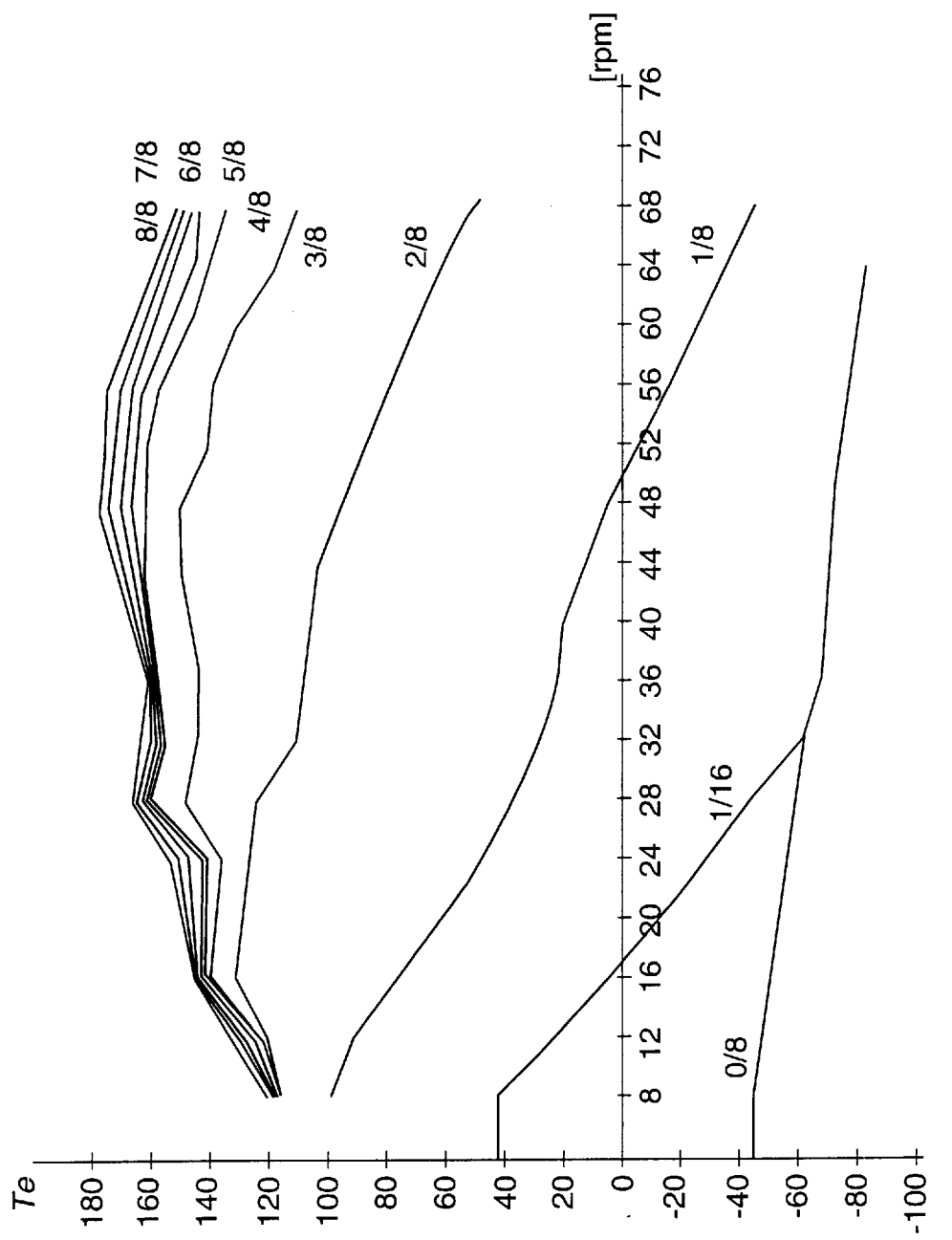
FIG. 8 is an engine characteristic map according to the third embodiment.

According to this embodiment, the second speed estimating unit 460 for example comprises an engine characteristic map 490 for searching the torque generated by the engine from the engine speed Ne and throttle opening Tvo, as shown in FIG. 8. It further comprises an acceleration estimating unit 500 which estimates an acceleration α produced in the vehicle using the following equation (4-1) from the obtained torque Te.

$$\alpha = \frac{i_{pR}}{M \cdot Rt} \cdot Te \quad (4\text{-}1)$$

where, $i_{pR}$=real gear ratio
M=vehicle mass
Rt=tire radius

A computing unit 510 then applies an open loop correction to the vehicle speed difference using the calculated acceleration α.

Figure 13A:
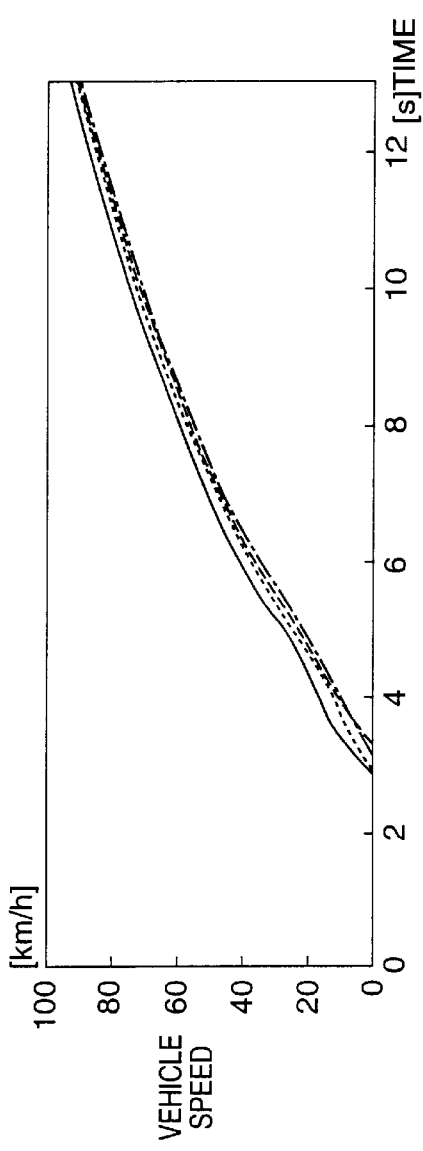
FIGS. 13A and 13B are graphs of vehicle speed and vehicle speed deviation showing simulation results applying the control diagram of the fourth embodiment without open loop correction.
Figure 13B:
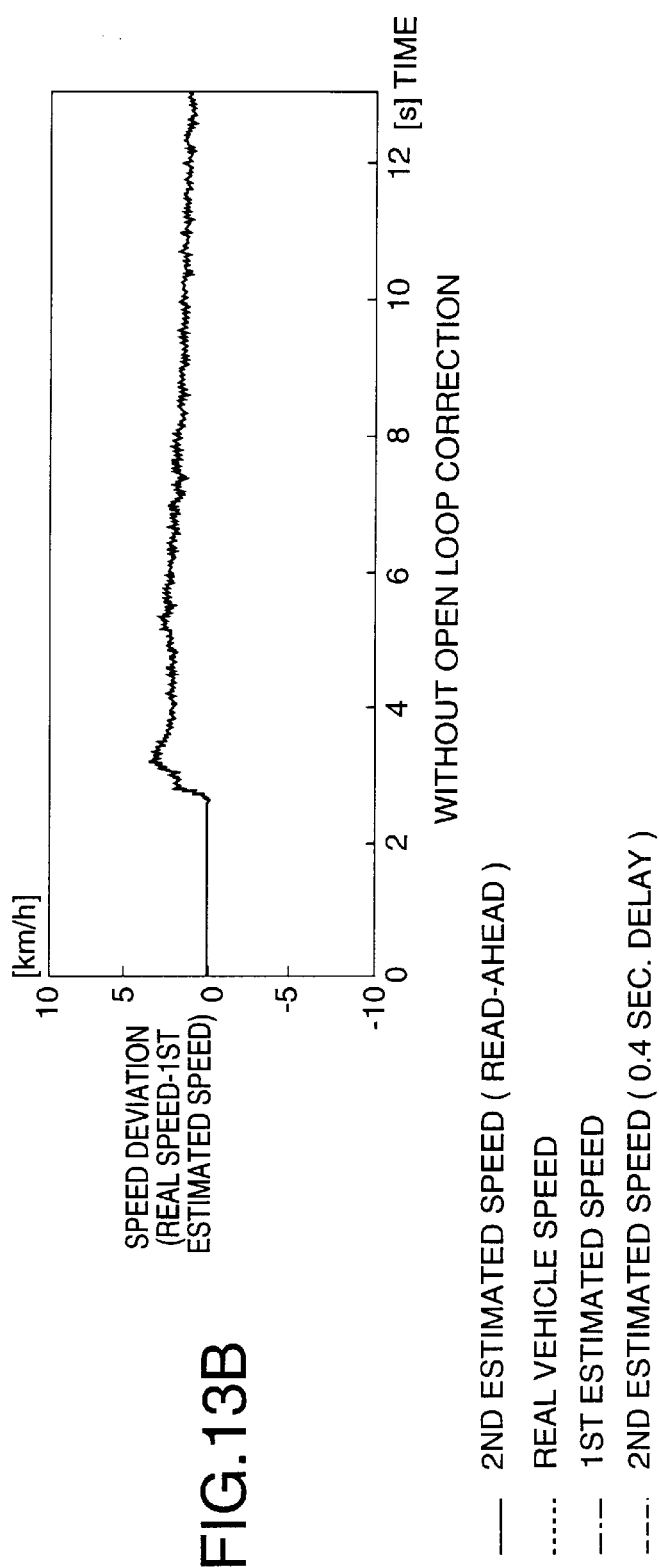
Figure 14A:
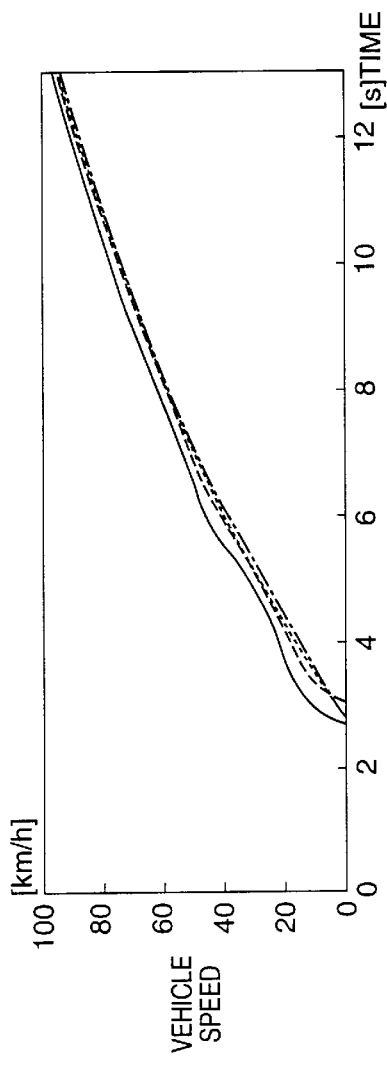
FIGS. 14A and 14B are graphs of vehicle speed and vehicle speed deviation showing simulation results applying the control diagram of the third embodiment with open loop correction.
Figure 14B:
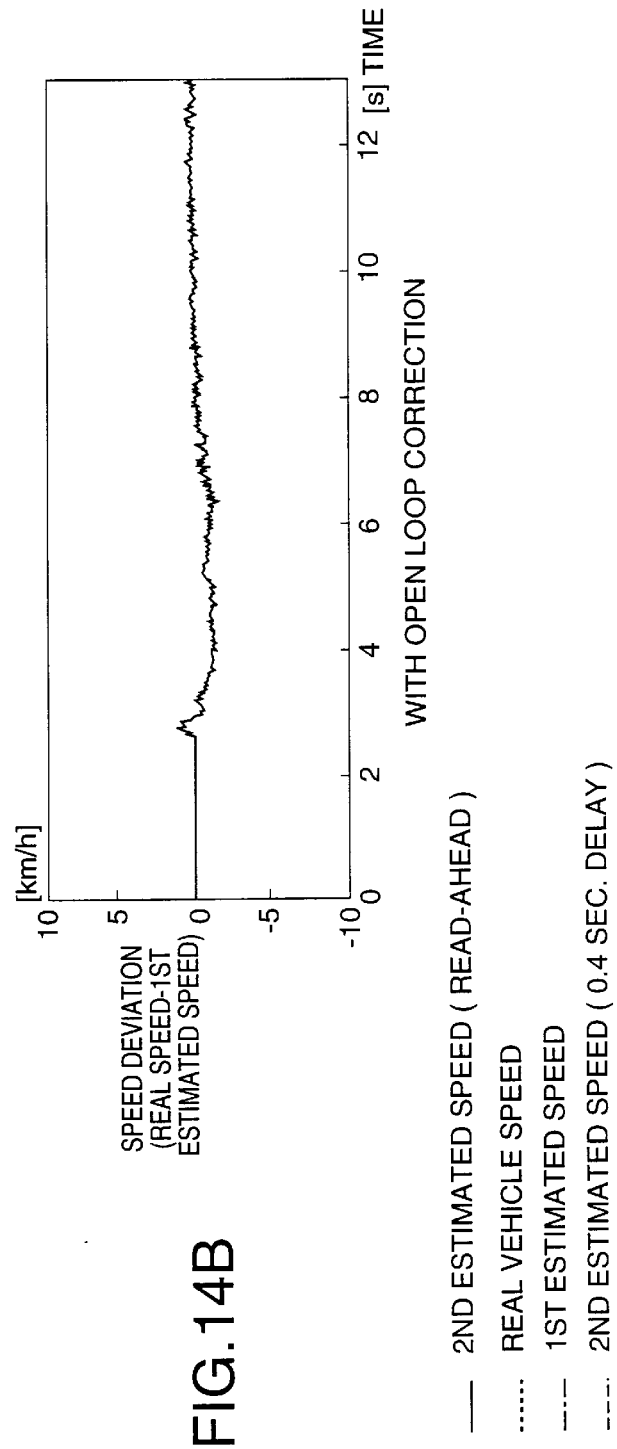

FIGS. 13A, 13B show simulation results when the open loop correction is not applied, and FIGS. 14A, 14B show simulation results when the open loop correction is applied. From these results, it is seen that the read-ahead vehicle speed can be estimated with still greater precision by applying the open loop correction. The constants and vehicle dimensions used by the vehicle speed estimating unit in the experiment were as follows.

Constants:
$T_1$=0.125 (sec)
$T_2$=0.49 (sec)
K=4.0

Vehicle dimensions:
M=1,561 (kg)
Rt=0.283 (m)

The embodiments of this invention in which an exclusive property or privilege is claimed are defined as follows:

What is claimed is:

1. A speed change ratio controller for a continuously variable transmission which changes and transmits a rotation speed of an engine output shaft of a vehicle to a drive shaft of the vehicle, comprising:
   means for detecting a travel speed of the vehicle,
   means for detecting a real speed change ratio of said continuously variable transmission,
   means for estimating a vehicle speed at a target predetermined future time based on said travel speed,
   means for computing a target speed change ratio based on the vehicle speed at the target predetermined future time, and
   means for controlling said real speed change ratio to the target speed change ratio.

2. A speed change ratio controller as defined in claim 1, wherein said vehicle speed estimating means comprises means for computing a feedback vehicle speed by processing the vehicle speed at the target predetermined future time with a predetermined lag element, means for calculating a difference between said travel speed and said feedback vehicle speed, and means for computing the vehicle speed at the predetermined future time by a predetermined integration based on said difference.

3. A speed change ratio controller as defined in claim 2, wherein said vehicle speed estimating means comprises means for detecting an engine load, means for detecting an engine rotation speed, means for computing a torque generated by said engine, means for computing a vehicle acceleration based on the generated torque and said real gear ratio, and means for computing a corrected difference based on the acceleration and said difference, and said vehicle speed computing means computes said vehicle speed at the predetermined future time by performing a predetermined integration based on this corrected difference.

4. A speed change ratio controller as defined in claim 2, wherein said lag element is a first order lag element specified by the following equation:

$$G_M(s) = \frac{1}{T_M \cdot s + 1}$$

where, $G_M(s)$=lag element
$T_M$=time constant corresponding to a read-ahead time targeted by the designer s=Laplace operator.

5. A speed change ratio controller as defined in claim 2, wherein said lag element is a dead time specified by the following equation:

$$G_M(s) = e^{-T_M \cdot s}$$

where, $G_M(s)$=lag element
$T_M$=time constant corresponding to a read-ahead time targeted by the designer
s=Laplace operator.

6. A speed change ratio controller as defined in claim 2, wherein said vehicle speed estimating means comprises a phase compensator for freely setting a response of the vehicle speed at the predetermined future time relative to a result of said predetermined integral calculation.

7. A speed change ratio controller as defined in claim 6, wherein a compensation of the phase compensator is specified by the following equation:

$$Gh(s) = \frac{T_1 \cdot s + 1}{T_2 \cdot s + 1}$$

where, $T_1$=phase compensation constant-1
$T_2$ =phase compensation constant-2.

* * * * *